United States Patent Office 3,469,807
Patented Sept. 30, 1969

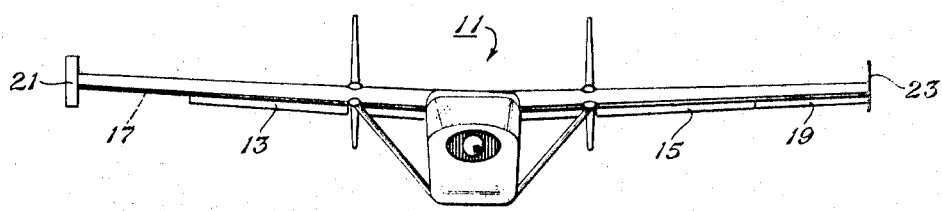
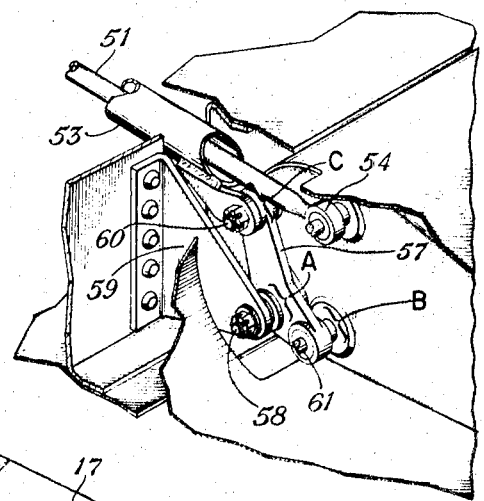
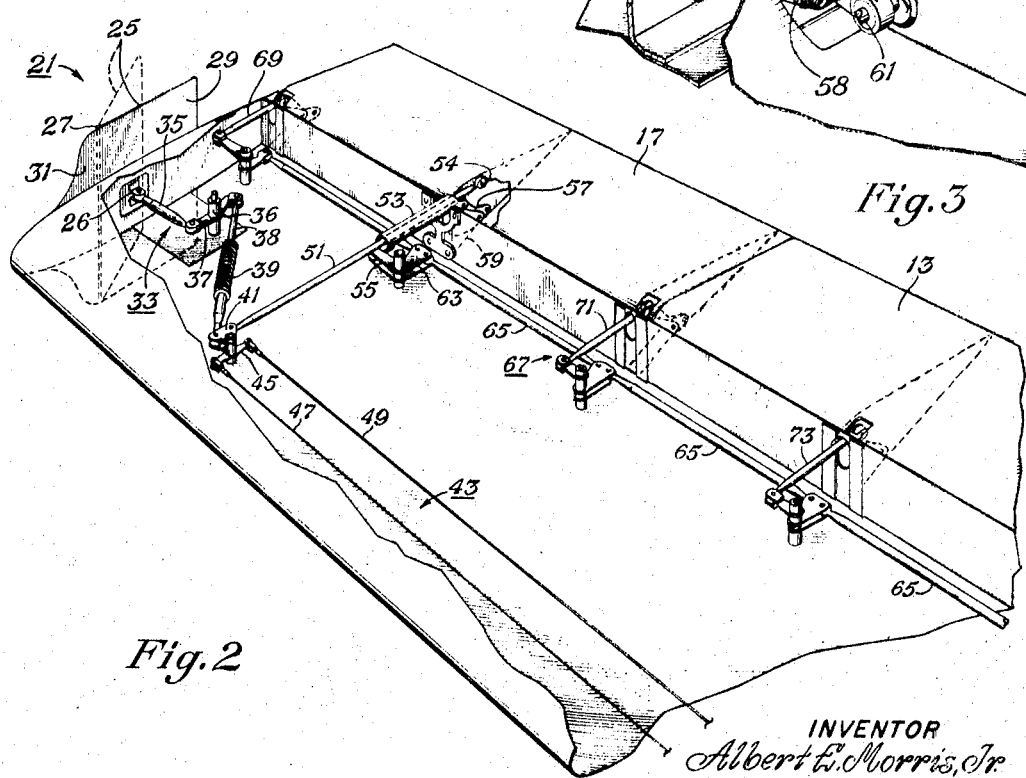

3,469,807
AIRCRAFT YAW CORRECTION MEANS
Albert E. Morris, Jr., Fort Worth, Tex., assignor to Wren Aircraft Corporation, Fort Worth, Tex.
Filed Oct. 6, 1967, Ser. No. 673,501
Int. Cl. B64c 5/08, 5/10, 9/12
U.S. Cl. 244—90    10 Claims

ABSTRACT OF THE DISCLOSURE

Following is disclosed aircraft yaw correction means that utilizes a movable vertical panel on each wing tip to equalize the drag of both wings when the drag would otherwise be unequal due to aileron use.

BACKGROUND AND GENERAL DISCUSSION

Some aircraft utilize ailerons as flaps to cooperate with the conventional flaps. In such instances the flap control mechanism is adapted to simultaneously raise or lower the flaps and ailerons. In addition, a separate aileron control mechanism is provided to enable independent aileron adjustment. A problem arises, however, if the ailerons and flaps are simultaneously lowered, and subsequently, independent aileron control is begun. On the wing in which the aileron is raised, the drag becomes significantly reduced. Such reduced drag may cause yaw which should by some means be removed. It is my purpose to provide improved means for compensating for the lost drag in such situations. To accomplish this purpose I utilize a vertical panel on each wing tip transverse to the longitudinal axis of the wing for outward movement when the associated aileron is moved upward a selected degree. The increased drag on the wing caused by the outward disposition of the vertical panel compensates for the drag lost by movement of the aileron from a downward to a more nearly horizontal position. Increased drag compensation occurs when each vertical panel opens from a stationary panel. The turbulence which results between the vertical panel and the stationary panel greatly increases drag.

BRIEF DESCRIPTION OF THE DRAWING

FIG. 1 is a front elevation view of a typical aircraft in which the ailerons are utilized as flaps; FIG. 2 is a fragmentary perspective view of a portion of an aircraft wing having apparatus embodying the principles of my invention; FIG. 3 is a fragmentary perspective view of a portion of the flap, aileron, and mounting means utilized in a preferred embodiment.

DESCRIPTION OF A PREFERRED EMBODIMENT

The numeral 11 in the drawing designates an aircraft having flaps 13, 15 and ailerons 17, 19 (aileron 17, being raised, does not appear in FIG. 1). Yaw correction means 21, 23 are disposed on the ends of each wing.

With reference to FIG. 2, yaw correction means 21 includes a movable vertical panel 25 transversely and here perpendicularly oriented relative to the longitudinal axis of the wing, being hinged at 27 to a stationary opposing panel 29. The hinge 27 in this instance is secured to a mounting plate 31 connected to the wing tip. A movable vertical panel control linkage 33 is pivotally connected with panel 25 as indicated by the numeral 26 to move it inward and outward. In this instance the control linkage 33 consists of an operating lever 35 extending between an arm 37 of a bell crank 36 which is actuated by a compressible linkage 38. Linkage 38 is in this instance a telescoping linkage which may include a spring 39 and extends between arm 40 of bell chank 36 and an arm 41 which is a part of an aileron control linkage 43.

The compressible linkage 38 permits a predetermined amount of movement of arm 41 and aileron control linkage 43 before the movable panel 25 is urged outward. The aileron control linkage includes a pivotally mounted yoke 45 to which control cables 47, 49 are secured.

A push rod 51 is pivotally secured to the arm 41 and extends through a tube 53 connected at 54 with the aileron 19. Tube 53 is pivotally connected to one arm 55 of a bell crank and to an arm 57 having one region A pivotally secured as indicated by the numeral 58 to the wing in the vicinity of a leading edge of the aileron by a bracket 59. A second region B of arm 57 is pivotally secured to the aileron as indicated by the numeral 61, and a third region C is pivotally connected to the tube 53 as indicated by the numeral 60. Another arm 63 of bell crank 55 is connected with a push rod 65 which is a portion of the combination flap and aileron control linkage designated by the numeral 67. As indicated in FIG. 2 of the drawing the flap control linkage 67 may drive a number of aileron push rods 69, 71, for example, and additional flap push rods 73 other than tubular push rod 53.

In operation, the combination flap and aileron control linkage 67 may be actuated such that push rod 65 is moved inboard to move the tubular push rod 53 rearward. This rotates the arm 57 (see FIG. 3) clockwise to move the aileron 17 downward. Push rod 53 simultaneously moves the flap 13 downward since it is connected with the push rod 65. Thus the aileron may be simultaneously operated with the flap control linkage 67. When independent aileron movement is needed, the aileron control linkage 43 is actuated and the push rod 51 moved forward to raise the aileron 17 a selected amount. Simultaneously, arm 41 moves counterclockwise as viewed in FIG. 2 and pulls the compressible link 38 until it ultimately rotates the arm 37 of the movable panel control linkage 33 in a clockwise direction. Consequently, operating lever 35 is pushed outward to open the movable vertical panel 25. This increases the drag lost by raising the aileron 19, thereby equalizing drag across both wings of the aircraft.

While I have shown my invention in only one of its forms it should be apparent to those skilled in the art that it is not so limited but is susceptible to various changes and modifications without departing from the spirit thereof. There are a wide variety of mechanical linkages which may be suitable for accomplishing the above results and, in its broadest aspects, my invention is not limited to specific forms of control means used to position the flaps, ailerons, and movable vertical panels. For example, compressible linkage 39 is only one of many types of "lost motion" devices that may be utilized. The tubular push rod 53 is not necessary since push rods 69, 71 may be relied upon exclusively to position the aileron 17 when using the flap control linkage 67. This would eliminate the necessity for having the arm 57 as shown in FIG. 3. Other modifications will occur to those skilled in the art.

I claim:
1. A system for equalizing wing drag in an aircraft having mutually connected ailerons and flaps, said system comprising:
   a movable vertical panel wholly mounted on a wing tip region transverse to the longitudinal axis of the wing;
   support means carried by the wing tip region and secured to the vertical panel to pivot the panel about a generally vertical axis adjacent its leading edge;
   said panel having a vertical surface facing an opposed surface carried by said wing tip region, both of which cooperate to form a zone of turbulent, drag increasing air flow when the movable panel is opened;

a flap control linkage connected with said ailerons and said flaps;

an aileron control linkage and mounting means operable independently of said flap control linkage;

a movable vertical panel control linkage connected with said aileron control linkage to move said vertical panel away from its opposed surface when the aileron is raised a selected distance.

2. The system defined by claim 1 in which a compressible link connects a bell crank of said aileron control linkage and a bell crank used to actuate the movable vertical panel after the aileron is raised a selected amount.

3. The system defined by claim 1 where said aileron control linkage and mounting means for each wing comprises:

an arm having one region pivotally secured to said wing in the vicinity of the leading edge of said aileron;

said aileron being pivotally secured to a second region of the arm;

a push rod actuated by said aileron control linkage and pivotally connected to said aileron a selected distance from the region of pivotal connection of said aileron and said arm; and the position of said arm being controlled by said flap control linkage.

4. The system defined by claim 3 in which a third region of said arm is pivotally connected to said flap control linkage.

5. The system defined by claim 4 in which a tubular push rod of the flap control linkage is pivotally secured to said third region of the arm; and said push rod of the aileron control linkage extends through said tubular push rod.

6. A system for equalizing wing drag in an aircraft having mutually connected ailerons and flaps, said system comprising:

a movable vertical panel wholly mounted on a wing tip region transverse to the longitudinal axis of the wing;

support means carried by the wing tip region and secured to the vertical panel to pivot the panel about a generally mounted axis adjacent its leading edge;

said panel having a vertical surface facing an opposed surface carried by said wing tip region, both of which cooperate to form a zone of turbulent, drag increasing air flow when the movable panel is opened;

flap and aileron control means to control jointly the ailerons and flaps and to control independently the ailerons; and a movable, vertical panel control means connected with an associated aileron to open said panel when the aileron is raised a selected distance.

7. The system defined by claim 6 in which a compressible link connects a bell crank of said flap and aileron control means to actuate the movable vertical panel after the aileron is raised a selected amount.

8. The system defined by claim 6 including an aileron control linkage and mounting means comprising:

an arm having one region pivotally secured to said wing in the vicinity of the leading edge of said aileron;

said aileron being pivotally secured to a second region of the arm;

a push rod actuated by said aileron control linkage and pivotally connected to said aileron a selected distance from the region of pivotal connection of said aileron and said arm; and the position of said arm being controlled by said flap control linkage.

9. The system defined by claim 8 in which a third region of said arm is pivotally connected to said flap control linkage.

10. The system defined by claim 9 in which a tubular push rod of the flap control linkage is pivotally secured to said third region of the arm; and said push rod of the aileron control linkage extends through said tubular push rod.

References Cited

UNITED STATES PATENTS

| 1,851,797 | 3/1932  | Almeida | 244—90 X |
| 1,992,157 | 2/1935  | Hall    | 244—90 X |
| 2,220,194 | 11/1940 | Albright | 244—90 X |
| 2,494,208 | 1/1950  | Schultz | 244—90 |
| 2,565,990 | 8/1951  | Richard | 244—90 |
| 2,846,165 | 8/1951  | Axelson | 244—90 |

FOREIGN PATENTS

| 466,070 | 10/1951 | Italy. |
| 575,471 | 2/1946  | Great Britain. |
| 691,665 | 5/1940  | Germany. |

MILTON BUCHLER, Primary Examiner

RICHARD A. DORNON, Assistant Examiner

U.S. Cl. X.R.

244—91